(12) United States Patent
Cooper (10) Patent No.: US 8,190,734 B2
(45) Date of Patent: May 29, 2012

(54) SYSTEM AND METHOD FOR NETWORK MONITORING OF INTERNET PROTOCOL (IP) NETWORKS

(75) Inventor: Geoffrey Howard Cooper, Palo Alto, CA (US)

(73) Assignee: McAfee, Inc., Santa Clara, CA (US)

( * ) Notice: Subject to any disclaimer, the term of this patent is extended or adjusted under 35 U.S.C. 154(b) by 202 days.

(21) Appl. No.: 12/470,350

(22) Filed: May 21, 2009

(65) Prior Publication Data

US 2009/0292805 A1 Nov. 26, 2009

Related U.S. Application Data

(60) Provisional application No. 61/054,945, filed on May 21, 2008.

(51) Int. Cl.
*G06F 15/173* (2006.01)
(52) U.S. Cl. ........................ 709/224; 709/223
(58) Field of Classification Search ................. 709/224, 709/223
See application file for complete search history.

(56) References Cited

U.S. PATENT DOCUMENTS

| | | | | |
|---|---|---|---|---|
| 7,362,752 B1* | 4/2008 | Kastenholz | .................... | 370/389 |
| 7,653,720 B1* | 1/2010 | Steeves | .......................... | 709/224 |
| 2003/0174718 A1* | 9/2003 | Sampath et al. | ............... | 370/401 |
| 2003/0179742 A1* | 9/2003 | Ogier et al. | .................... | 370/351 |
| 2004/0052260 A1* | 3/2004 | Tabu | ............... | 370/392 |
| 2004/0205247 A1* | 10/2004 | Ahn | ................ | 709/245 |
| 2004/0223502 A1* | 11/2004 | Wybenga et al. | .............. | 370/401 |
| 2005/0195831 A1* | 9/2005 | Wybenga et al. | ........ | 370/395.31 |
| 2006/0069858 A1* | 3/2006 | Abdat | ............................ | 711/108 |
| 2006/0120382 A1* | 6/2006 | Thubert et al. | ............. | 370/395.52 |
| 2006/0277184 A1 | 12/2006 | Faitelson et al. | | |
| 2007/0011297 A1* | 1/2007 | Boylan et al. | .................. | 709/223 |
| 2007/0067431 A1* | 3/2007 | Yoshihara et al. | ............. | 709/223 |
| 2008/0109870 A1 | 5/2008 | Sherlock | | |
| 2009/0182953 A1* | 7/2009 | Merkey et al. | ................. | 711/136 |
| 2010/0067390 A1 | 3/2010 | Pereira et al. | | |

FOREIGN PATENT DOCUMENTS

| | | |
|---|---|---|
| EP | 1054529 A2 | 11/2000 |
| WO | WO-0203219 A1 | 1/2002 |
| WO | WO-2008044225 A2 | 4/2008 |
| WO | WO-2009142751 A2 | 11/2009 |
| WO | WO-2009142751 A3 | 3/2010 |

OTHER PUBLICATIONS

"U.S. Appl. No. 12/454,773, Restriction Requirement mailed Nov. 3, 2011", 9 pgs.
"European Application Serial No. 09750982.2, Office Action Response filed Aug. 16, 2011", 7 pgs.
"International Application Serial No. PCT/US2009/003161, International Preliminary Report on Patentability mailed Sep. 10, 2010", 23 pgs.
"International Application Serial No. PCT/US2009/003161, Partial International Search Report mailed Sep. 1, 2009", 5 pgs.

(Continued)

*Primary Examiner* — David Lazaro
*Assistant Examiner* — Waseem Ashraf
(74) *Attorney, Agent, or Firm* — Schwegman, Lundberg & Woessner, P.A.

(57) ABSTRACT

A system and method for implementing network monitoring with a unified IPv4+IPv6 address type. IPv4 network traffic and IPv6 network traffic are captured. IPv4 and IPv6 address patterns read from the captured network traffic are then encoded into a unified IPv4+IPv6 address space using a data type encoding.

13 Claims, 4 Drawing Sheets

OTHER PUBLICATIONS

"International Application Serial No. PCT/US2009/003161, Search Report mailed Feb. 1, 2010", 10 pgs.

"International Application Serial No. PCT/US2009/003161, Written Opinion mailed Feb. 1, 2010", 14 pgs.

Jain, A K, et al., "Data clustering: a review", ACM Computing Surveys vol. 31, No. 3, XP002165131 ISSN: 0360-0300, (Sep. 1, 1999), 264-323.

Jitian, X, et al., "Measuring similarity of interests for clustering Web-users", Database Conference ADC Proceedings, XP010532230, ISBN: 978-0-7695-0966-2, (Jan. 29, 2001), 107-114.

Komlodi, A, et al., "A User-centered Look at Glyph-based Security Visualization", Visualizations for Computer Security, IEEE Workshop XP031385959 ISBN: 978-0-7803-9477-3, (Oct. 26, 2005), 3 pgs.

\* cited by examiner

SYSTEM AND METHOD FOR NETWORK MONITORING OF INTERNET PROTOCOL (IP) NETWORKS

RELATED APPLICATION

This patent application claims the priority benefit of U.S. Provisional Patent Application Ser. No. 61/054,945 filed May 21, 2008 and entitled "ENHANCED DISCOVERY WITH IDENTITIES", the content of which is incorporated herein by reference in its entirety.

TECHNICAL FIELD

The disclosure relates generally to network security and in particular to systems and methods for network monitoring of Internet Protocol (IP) networks.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

In a network monitoring system, the source and destination Internet Address of network traffic forms the basic key for most data viewing and indexing. This presents particular problems in the transition from IPv4 to IPv6.

When an IPv4 network monitor is enhanced to support IPv6, the indexing of all data must now cope with the larger address space. Further, the introduction of IPv6 into the network does not remove the need to monitor IPv4. Essentially, the monitor goes from being a single protocol to a multi-protocol monitoring device.

Even so, IPv4 and IPv6 are functionally equivalent in the network, and we would hope that the monitor would embody this fact. For example, a security attack in HTTPv4 exercises the identical client software in HTTPv6. What is needed is a security monitor that ensures that a policy to detect one Internet Protocol detects the other, without the need for user intervention or reprogramming of policy.

DETAILED DESCRIPTION

As noted above, in a network monitoring system, the source and destination Internet Address of network traffic forms the basic key for most data viewing and indexing. This presents particular problems in the transition from IPv4 to IPv6. We solve this problem using a unified IPv4+IPv6 address type.

Why a unified IPv4+IPv6 address type? The two most obvious approaches to incorporating both IPv4 and IPv6 addressing are address tagging and address containment. In address tagging, each address is prefixed with a tag, giving its address type. This is used in the "struct sockaddr" mechanism in the BSD-derived socket interface. In address containment, the smaller of the two addresses (i.e., IPv4) is mapped into an unused subset of the larger address (IPv6). This is used in the "IPv4 mapped address" concept in RFC3493, and is part of the IPv6 transition plan.

In the case of address tagging, it is hard to treat IPv4 and IPv6 as the same. This makes it harder to implement the natural functional equivalence of the protocols by: sorting them together (reports), applying CIDR rules, combining them with UDP or TCP port numbers, etc.

In the case of address containment, functional equivalence is easier to implement. However, the special nature of a network monitor still causes problems. Which part of the IPv6 address space is "ripe" for adoption of the IPv4 address space? Although many IPv6 addresses are illegal (or even specifically intended to encapsulate IPv4 addresses), could these not also appear on the network? In fact, these illegal addresses are obvious targets for a would-be attacker. Also, the null IPv4 and IPv6 addresses (0.0.0.0 and ::) are often used to indicate that "no" or "any" IP address will do. How does one distinguish this encoding from actually seeing such an address on the network?

In one embodiment, a tagged address variant is used, where a data abstraction ("class") is used to encapsulate the semantic notion of a unified IPv4+IPv6 address space or "UIP". In one such embodiment, UIP is implemented compatibly in C, C++, Java and Perl.

Figure 1A:
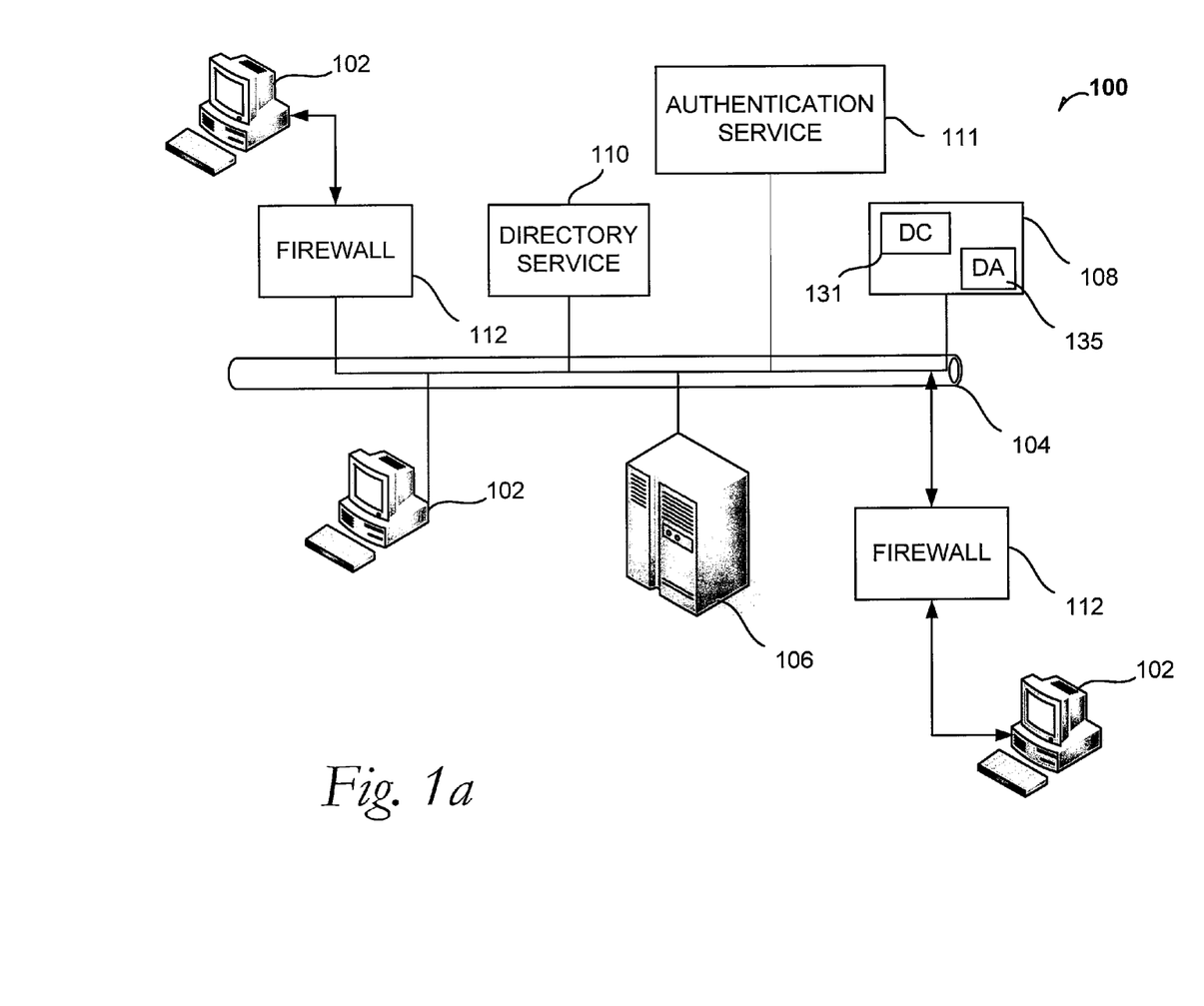
FIGS. 1a and 1b illustrate computer systems having one or more network monitors.

FIG. 1a illustrates a system which monitors network traffic. The traffic may be IPv4 or IPv6, or a combination of the two. In FIG. 1, computer system 100 includes a number of workstations 102 and one or more data centers 106 having one or more servers or mainframes each. Workstations 102 communicate with data centers 106 over a network 104. In the embodiment shown, some of the workstations 102 communicated with data center 106 via a firewall 112 communicatively coupled to network 104.

In computer system 100 of FIG. 1a, a network monitor 108 continuously monitors network traffic on network 104. In one embodiment, monitor 108 includes a data collector (DC) 131 connected to a data analyzer (DA) 135. Discovery data collector 131 passively captures network traffic. Data analyzer 135 decodes and analyzes the captured network traffic.

In one embodiment, network monitor 108 provides automated, identity-based monitoring to keep computer system 100 in compliance and in control. Such a comprehensive monitoring delivers complete visibility and verification of who is doing what and where on an automated, continuous, real-time basis. By identity, we mean the actual user name, group name, and role correlated to behavior and delivered in real time—not after the fact.

In one embodiment, network monitor 108 communicates with a directory service 110 and an authentication service 111 over network 104. In one such embodiment, network monitor 108 integrates with existing directory stores, such as Microsoft Active Directory, leveraging actual user and group information to dynamically determine when a user accesses the network. In another such embodiment, network monitor 108 integrates with existing directory stores, such as Microsoft Active Directory, leveraging actual user, group, and role information to dynamically determine when a user accesses the network. Network monitor 108 queries the directory in real time, and then correlates users and their groups with all related access and activity. In one embodiment, user identity credentials are detected in the traffic without the use of any agents on the client or server side.

For example, a user named jsmith logs into the network. Network monitor 108 identifies this action and immediately determines that jsmith is part of the marketing group and has a job role that allows her access to the marketing database and a joint-venture database but not the finance database. Network monitor 108 continues to monitor network traffic to ensure that jsmith's actions abide by this policy as well as all other established security controls.

In one embodiment, monitors 108 passively capture, decode, and analyze traffic via native deep packet inspection (DPI). They use port mirroring or passive network taps to obtain full packet data for protocol decoding up to the application layer (layer 7). This level of detail is often required to ensure a tamperproof view of network activity within critical data centers and critical business systems.

In one such embodiment, flow monitors within monitor 108 leverage existing flow-based data from Cisco Netflow, Juniper J-Flow, and others for analysis. This broader network view is often useful for gaining a cost-effective, enterprise-wide view of who is doing what and from where across the entire network, including remote locations.

In another such embodiment, network monitors are used in a "Mixed" mode that combines both DPI and flow-based data.

In one embodiment, network monitor 108 is part of a tiered architecture that comprises network monitors 108, control centers and report appliances. This approach has the deployment advantages of an out-of-band, network-based solution without the need for agents or application integration.

In such an approach, network monitors 108 provide the cornerstone monitoring function. Monitors 108 are network-based and designed to capture and analyze critical traffic data inside the network using one of the three methods described above.

Figure 1B:
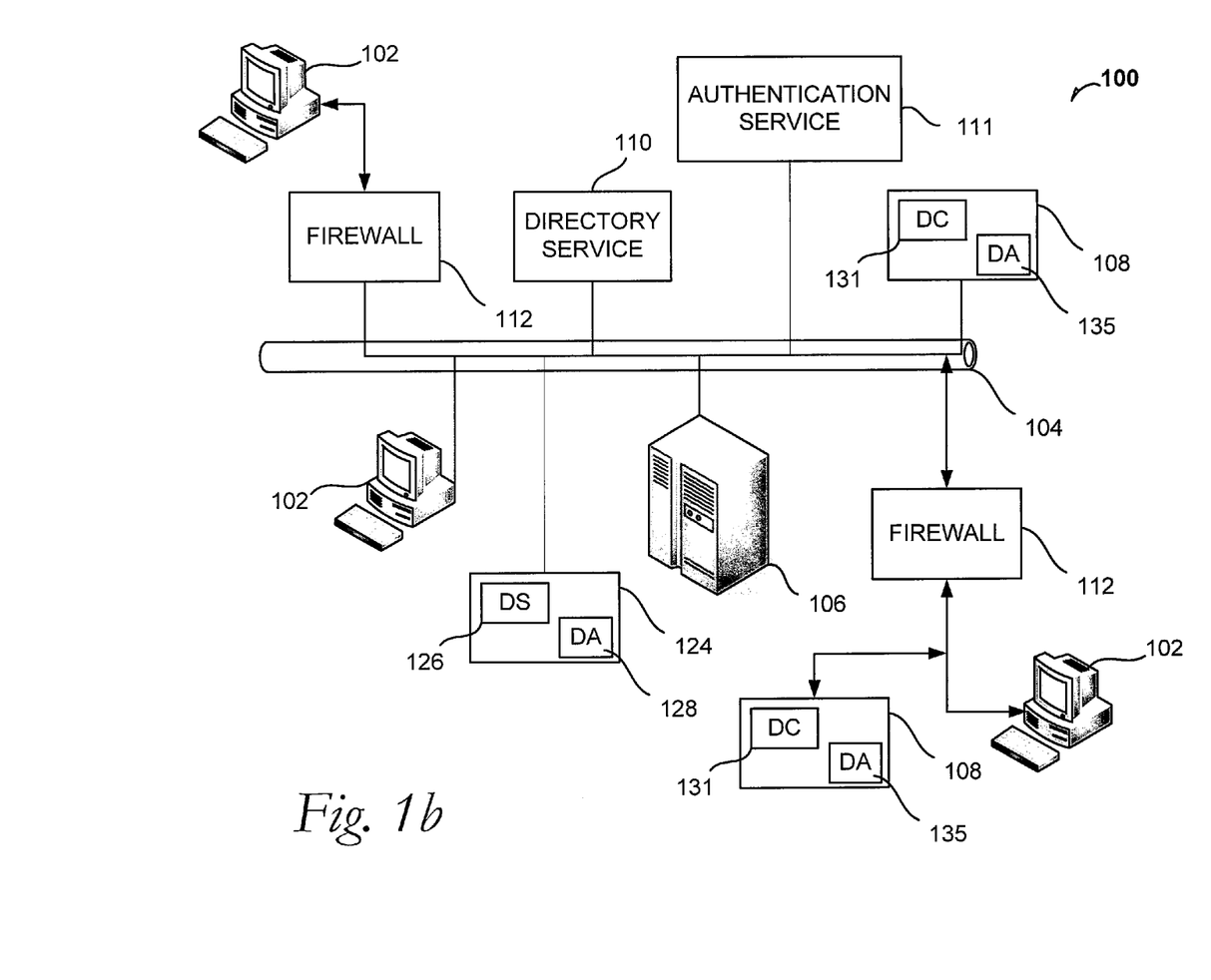

As shown in FIG. 1b, in some embodiments, computer system 100 includes two or more network monitors 108 and a control center 124. Control center 124 consolidates and centralizes the ongoing monitoring, analysis, and management of all sizes of deployments—everything from a few network monitors 108 to a worldwide deployment of network monitors 108. In one embodiment, control center 124 includes a data store (DS) 126 connected to a data analyzer 128. Data store 126 stores discovery data accessed remotely from the one or more network monitors. Data analyzer 124 decodes and analyzes the discovery data.

In one such embodiment, large entities can easily stratify and delegate their management capabilities with control center 124. For example, you could retain the ability to analyze and control network activity at an overall organizational level while also allowing your various operating divisions or security zones to monitor and manage network activity that's specific to their group.

Network monitor 108 and control center 124 employ a unified IPv4+IPv6 address type in order to handle network traffic in both IPv4 and IPv6. In one embodiment, we use a tagged address variant, where a data abstraction ("class") is used to encapsulate the semantic notion of a unified IPv4+IPv6 address space or "UIP".

Figure 2:
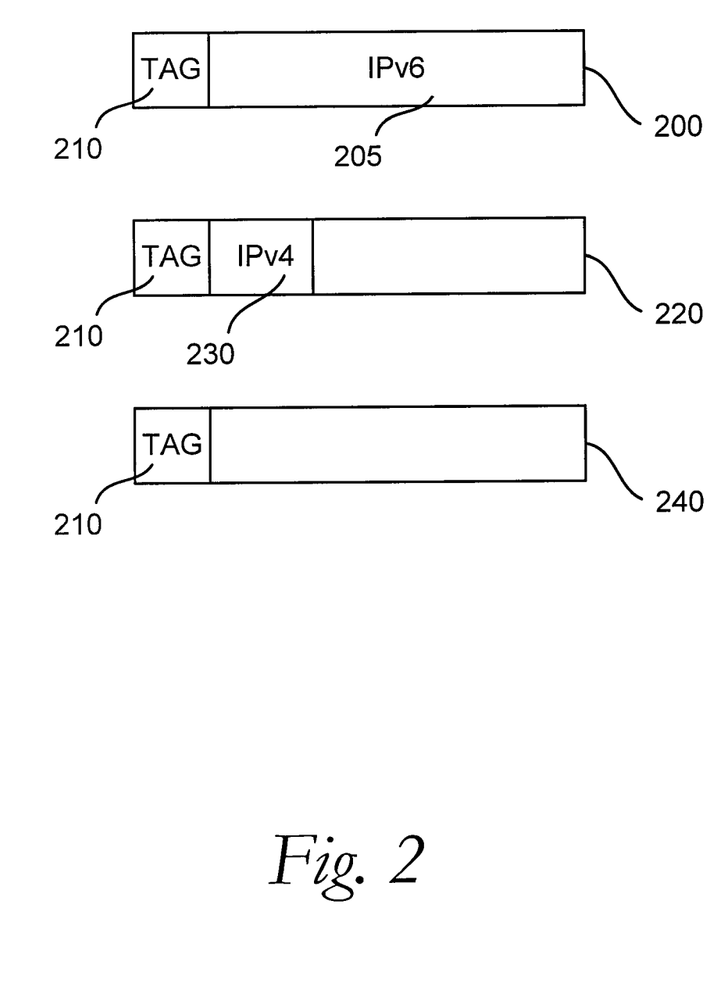
FIG. 2 illustrates the logical representation of the Unified IP address as a tagged data structure.

As shown In FIG. 2, the UIP class logically implements a 130-bit address space. As shown in FIG. 2, a two bit tag 210 selects from the values: null, IPv4, IPv6. A null address 240 has only a tag 210; an IPv4 address 220 has a 32-bit address 230, and an IPv6 address has a 128-bit address value 205. Comparisons sequence the values with null first, then IPv4, then IPv6. Class constructors are provided to create data values based on packet encodings, host-specific (i.e., byte swapped) encodings, ASCII encoding, etc.

As a porting technique, all use of IPv4 and IPv6 (except in actual packet headers) is replaced by the UIP type. When address arithmetic is used, arithmetic is also converted to use the UIP class. We have found that a preference for doing this at a higher level, where a new UIP method is introduced to subsume the entire address operation. For example, a UIP containment primitive was introduced to provide a higher level view of IP address containment.

There were several benefits to this approach. The most obvious was the ability to do address arithmetic operations very efficiently. Since the entire operation is within the class, the class can make use of internal data formats to incur only the overhead needed. For example, an operation that was originally done via a series of 32-bit masking operations in a register can still be done that way—for IPv4 addresses. It must also be implemented, with higher cost, for IPv6 addresses.

A hidden benefit was the removal of many confusing byte swapping operations within the code. Occasionally addresses are stored in different byte orderings within the same database, file or program. Code is hard to maintain because the programming language does not help to describe the byte ordering of the arguments to a given method or procedure, and conventions are often poorly document or forgotten over time.

In one embodiment, UIP eliminates the need for byte swapping operations. The initial packet decomposition uses a constructor for "network" order. Constants are initialized using strings or other calling conventions that make byte order clear (e.g., an IPv4 constructor that takes 4 arguments, one for each byte, in notational order).

In one embodiment, comparison operations are added to the implementation of the UIP, such that UIP addresses sort with all IPv4 addresses listed first in numerical order, followed by all IPv6 addresses listed in numerical order.

When UIP addresses must be stored in a file or database, or otherwise transmitted between applications (possibly written in different programming languages), the concept of a data type encoding is used. A data type encoding guarantees that the decode of an encode of a value yields the exact same value. Thus if the encoded bits are preserved, the original data type value may be retrieved. Textual encoding is always possible, but relatively inefficient. We introduce three additional encoding methods: binary; packed binary, and text binary. All implementations of UIP support all the encodings, so that encoded data may be passed between them, whether they reside on different computer architectures or are implemented in different computer languages.

The binary encoding is a fixed length encoding that is very efficient to construct and parse. In one embodiment, we use a 17-byte encoding consisting of a tag byte and zero, 4, or 16 address bytes, based on the tag, with any remaining bytes set to zero.

The packed binary encoding saves memory by ensuring that smaller addresses are packed into a smaller space (e.g., null and IPv4 addresses). On parsing, the first byte of the encoding must be read first, and the external software uses a specially provided method to determine how many bytes are in contained in the address.

The text binary encoding is a textual encoding that provides increased efficiency when the reader of the text is a program. The external software must use special characters or white space to delimit the text, which may be variable length. A prime use is for storing an IP address in a URL. In one embodiment, the text binary encoding is a hexadecimal representation of the packed binary encoding. Other embodiments are possible (e.g., base 64).

For example, a UIP value created in a C program may be encoded and passed in memory to a C++ program, which decodes it into the C++ implementation of UIP. Subsequently, the C++ program encodes the value again and stores it in a SQL database. A Java program on another computer later reads the database entry via remote query, decodes the value and derives the same UIP value in the Java implementation of the type. Note that the C, C++ and Java representations of this value may all be different in memory.

Although the UIP class is functionally equivalent in the various language implementations, each implementation has its own characteristics that may make it easier to use in one context than another.

In one embodiment, the C and C++ implementations share a common, mutable, representation. A special method gives a C++ "view" of the C object, which makes shared data structures easier to use. The representation is as unsigned char[17], with the first byte giving the tag and the subsequent bytes giving address. Unused address bytes are left as "don't care."

In one embodiment, tag 210 is a four bit value encoded as 0 for null, 3 for IPv4 and 15 for IPv6. These values are chosen so that ((tag+1) & 15) gives the length of the address in a manner which can be handed to comparison or copy procedures with impunity.

In one embodiment, the Perl implementation uses a String Value to store the same representation as the C implementation.

In one embodiment, the Java implementation uses an immutable data type for UIP. The representation is a tag stored in a byte and two long values, each with 64 bits of address. IPv4 data is padded into the lower 32 bits of first long. IPv6 data is stored in both long's, with the upper half of the address in the first and the lower half in the second. This representation is chosen over a (simpler) byte array representation to decrease memory churn (our representation requires only a single memory allocation per UIP object). Some operations are made more complex by this representation, but we feel that these are less common in network monitoring code.

For readability, in one embodiment, the "factory style" of constructors is used in Java. This makes it clear whether a given constructor taking 32-128 bits of data is interpreted the data in host format, network format, IPv4, IPv6, mapped IPv4, etc.

The unified IP address data (UIP) abstraction is a powerful tool for integrating IPv6 into IPv4-based network monitoring systems. It provides for efficient operation, recognition of all address patterns in the packet, and cross-language/cross-platform compatibility. It also simplifies the code to swap address data between network and host byte order.

Figure 3:
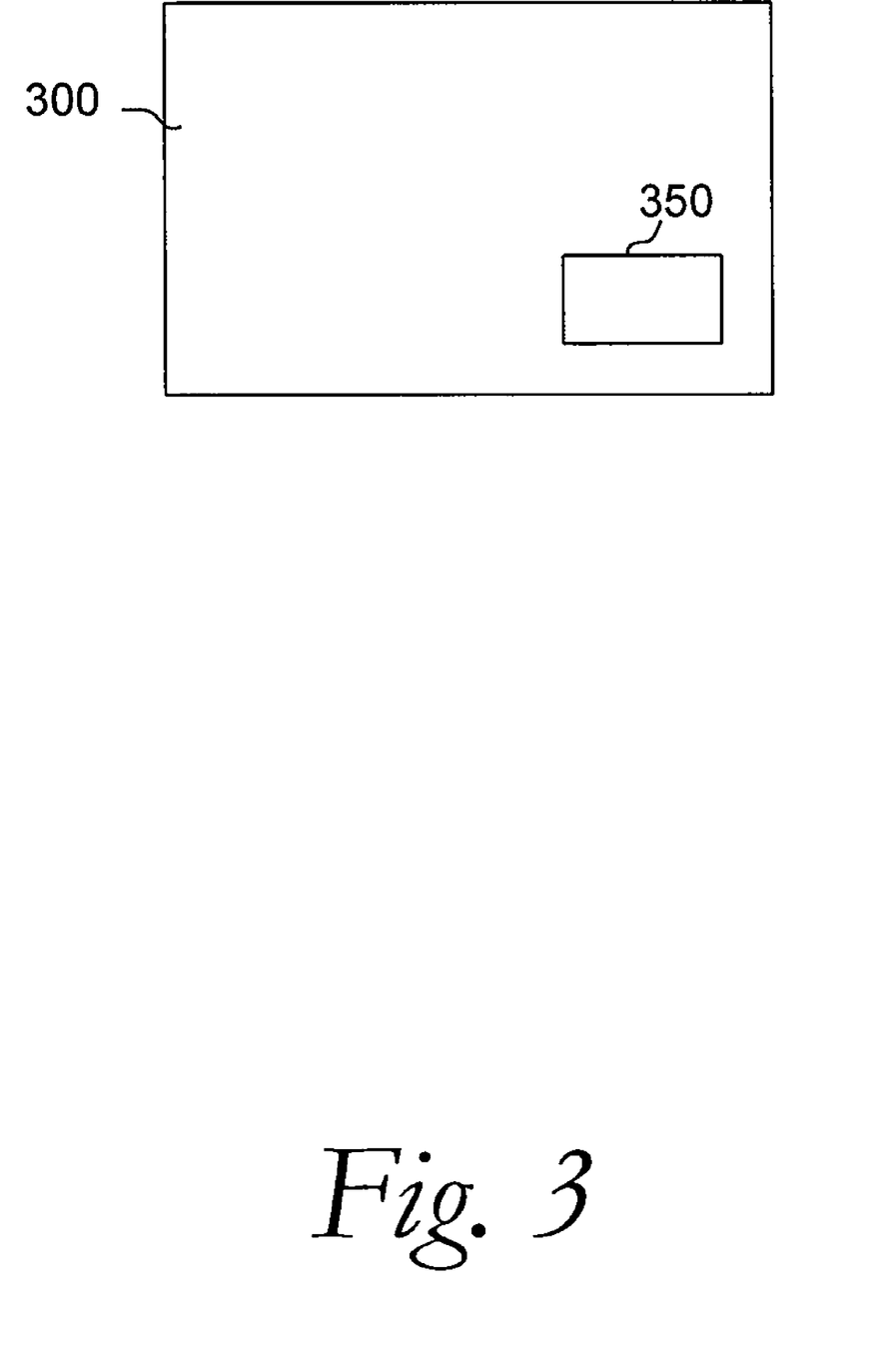
FIG. 3 is a schematic diagram illustrating a medium having an instruction set for implementing the systems and methods described.

FIG. 3 is a schematic diagram illustrating a medium having an instruction set that results in a network monitoring system and method having a unified IPv4+IPv6 address type according to an example embodiment. A machine-readable medium 300 includes any type of storage medium such as a disk drive or a solid state memory device, or the like. A machine-readable medium 300 includes instructions within an instruction set 350. The instruction set 350, when executed by a machine such as an information handling system or a processor, cause the machine to perform operations such as network monitoring.

Although the various methods for implementing network monitoring system and method having a unified IPv4+IPv6 address type have been described with reference to specific example embodiments, it will be evident that various modifications and changes may be made to these embodiments without departing from the broader embodiment of the disclosed subject matter. Accordingly, the specification and drawings are to be regarded in an illustrative rather than a restrictive sense.

Although specific embodiments have been illustrated and described herein, it will be appreciated by those of ordinary skill in the art that any arrangement that achieves the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

I claim:

1. A network monitor, comprising: a discovery data collector, wherein the discovery data collector includes a processor, wherein the processor captures IPv4 and IPv6 network traffic from a network; and a data analyzer, wherein the data analyzer receives the network traffic captured by the discovery data collector, encodes IPv4 and IPv6 address patterns read from the captured network traffic into a unified IPv4+IPv6 (UIP) address space, modifies the captured network traffic to replace address patterns received with the captured network traffic with its tagged address variants, and analyzes the modified network traffic in the UIP address space, wherein the UIP address space logically implements an M+N bit address space including an N-bit tag and an M-bit address field; wherein the UIP address space is implemented as a UIP class and wherein address arithmetic on the address patterns is performed as operations within the UIP class.

2. The network monitor of claim 1, wherein the N-bit tag identifies IPv4 address patterns, IPv6 address patterns and null patterns.

3. The network monitor of claim 1, wherein the data analyzer includes comparison operations, wherein the comparison operations sort modified captured network traffic with IPv4 and IPv6 addresses with all IPv4 addresses in numerical order first, followed by all IPv6 addresses in numerical order.

4. A non-transitory computer readable storage medium having instructions thereon, wherein the instructions, when executed by a machine, create the network monitor of claim 1.

5. A method of monitoring network traffic on a network, comprising: capturing via a processor, IPv4 and IPv6 network traffic; encoding IPv4 and IPv6 address patterns read from the captured network traffic into a unified IPv4+IPv6 (UIP) address patterns reflective of the UIP address space; modifying the captured network traffic to replace address patterns received with the captured network traffic with tagged address variants; storing the modified captured network traffic; and analyzing the modified captured network traffic in the UIP address space; wherein the UIP address space logically implements an M+N bit address space including an N-bit tag and an M-bit address field; wherein the UIP address space is implemented as a UIP class and wherein address arithmetic on the address patterns is performed as operations within the UIP class.

6. The method of claim 5, wherein encoding IPv4 and IPv6 address patterns includes adding a tag used to identify the encoded pattern, wherein the tag identifies IPv4 and IPv6 address patterns and null patterns.

7. The method of claim 5, wherein encoding IPv4 and IPv6 address patterns includes:

representing each IPv4 address pattern with an N bit field identifying the address pattern as a IPv4 address pattern and an M bit field storing the IPv4 address; and representing each IPv6 address pattern with an N bit field identifying the address pattern as a IPv6 address pattern and an M bit field storing the IPv6 address;

wherein N is an integer of at least one; and wherein M is an integer of no less than 128 bits.

8. The method of claim 5, wherein analyzing includes performing, comparison operations, wherein the comparison operations sort modified captured network traffic with IPv4 and IPv6 addresses with all IPv4 addresses in numerical order first, followed by all IPv6 addresses in numerical order.

9. A non-transitory computer readable storage medium having instructions thereon, wherein the instructions, when executed by a machine, perform the method of claim 5.

10. A system for analyzing IPv4 and IPv6 network traffic, comprising: a data store, wherein the data store includes discovery data having IPv4 and IPv6 network traffic captured from a network; and a data analyzer, wherein the data analyzed includes a processor, wherein the processor receives the discovery data, encodes IPv4 and IPv6 address patterns read from the discovery data into a unified IPv4+IPv6 (UIP) address space, modifies the discovery data received from the data store to replace address patterns received from the data store with tagged addressed variants, stores the modified network traffic with its tagged address variants and analyzes the modified network traffic in the UIP address space, wherein the UIP address space logically implements an M+N bit address space including an N-bit tag and an M-bit address field; wherein the UIP address space is implemented as a UIP class and wherein address arithmetic on the address patterns is performed as operations within the UIP class.

11. The system of claim 10, wherein the N-bit tag identifies IPv4 address patterns, IPv6 address patterns and null patterns.

12. The system of claim 10, wherein the data analyzer includes comparison operations, wherein the comparison operations sort modified captured network traffic with IPv4 and IPv6 addresses with all IPv4 addresses in numerical order first, followed by all IPv6 addresses in numerical order.

13. The system of claim 10, wherein UIP addresses are encoded using a data type encoding.

* * * * *

UNITED STATES PATENT AND TRADEMARK OFFICE
CERTIFICATE OF CORRECTION

| | | |
|---|---|---|
| PATENT NO. | : 8,190,734 B2 | |
| APPLICATION NO. | : 12/470350 | |
| DATED | : May 29, 2012 | |
| INVENTOR(S) | : Geoffrey Howard Cooper | |

It is certified that error appears in the above-identified patent and that said Letters Patent is hereby corrected as shown below:

On the face page 1, under "Foreign Patent Document", in column 2, line 2, after "WO", delete "WO-02003219", and insert --WO-2002003219--, therefor On the face page 2, under "Other Publications", in column 1, line 5, delete "A K,", and insert --A. K.,--, therefor

On the face page 2, under "Other Publications", in column 2, line 1, delete "X,", and insert --X.,--, therefor On the face page 2, under "Other Publications", in column 2, line 4, delete "A,", and insert --A.,--, therefor In column 3, line 61, delete "In", and insert --in--, therefor In column 4, line 43, after "Thus", insert --,--, therefor Signed and Sealed this
Second Day of October, 2012

David J. Kappos
*Director of the United States Patent and Trademark Office*